Dec. 25, 1923.
W. BITTROLF
1,478,814
MANUFACTURE OF CHAIN MESHWORK AND CHAINS
Filed Aug. 30, 1921  5 Sheets-Sheet 1
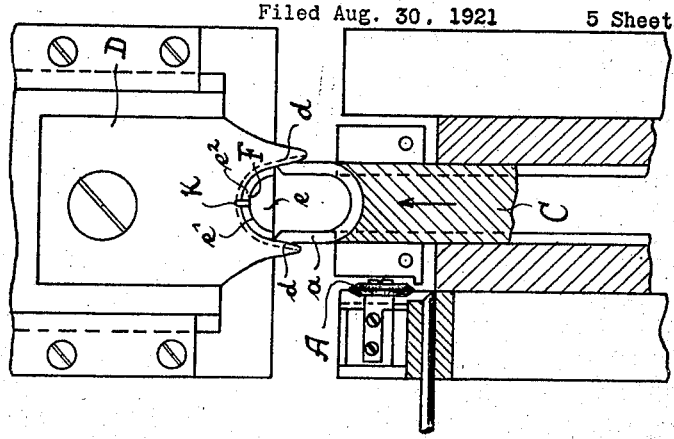
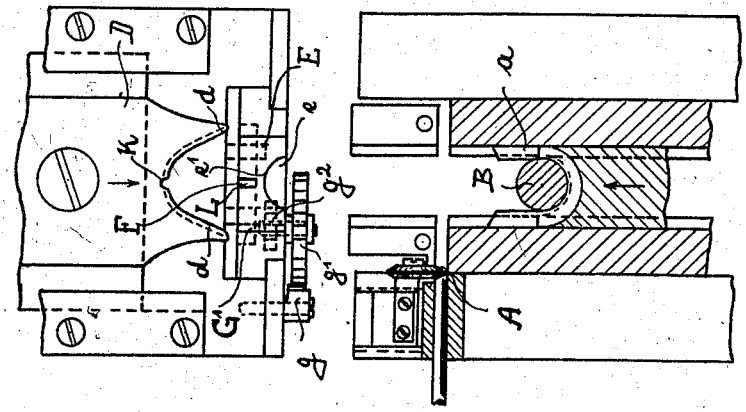
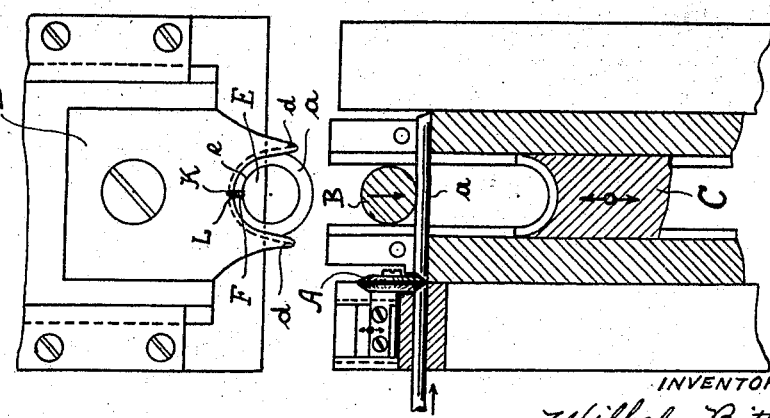
INVENTOR
Wilhelm Bittrolf
BY
Briesen & Schrenk
ATTORNEYS.

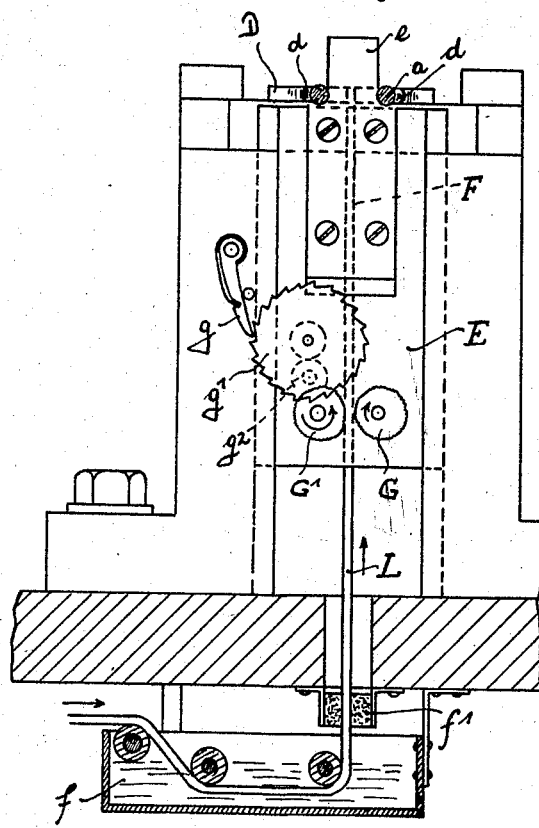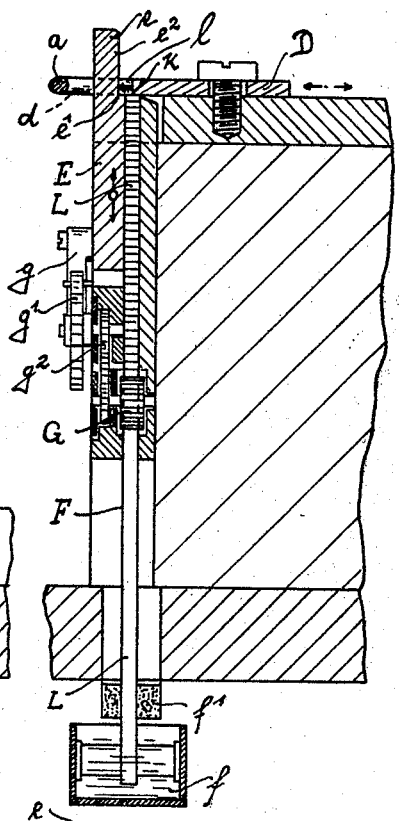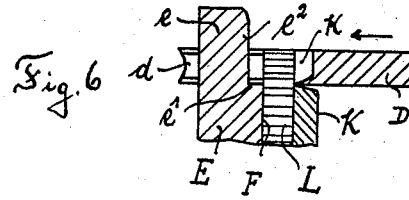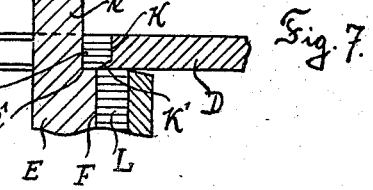

Dec. 25, 1923.  W. BITTROLF  1,478,814
MANUFACTURE OF CHAIN MESHWORK AND CHAINS
Filed Aug. 30, 1921   5 Sheets-Sheet 3
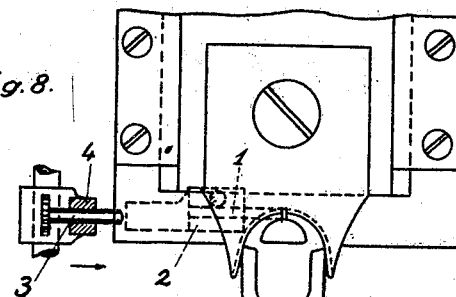
Fig. 8.
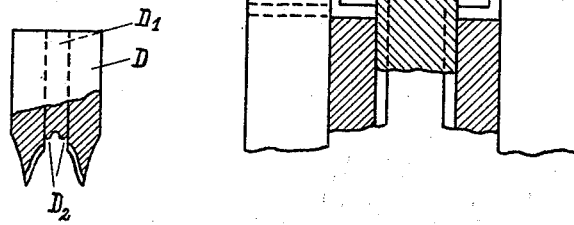
Fig. 16.
Fig. 9.
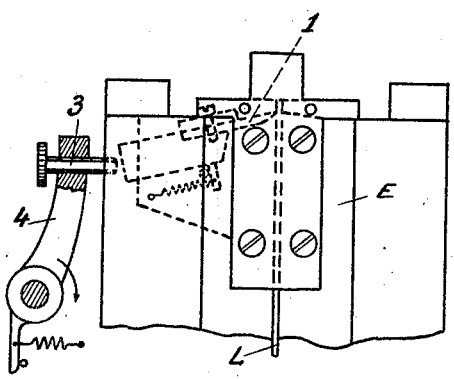
Fig. 10.
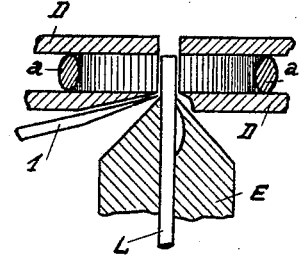
INVENTOR
Wilhelm Bittrolf
BY
Biesen Schenck
ATTORNEYS Dec. 25, 1923.  W. BITTROLF  1,478,814
MANUFACTURE OF CHAIN MESHWORK AND CHAINS
Filed Aug. 30, 1921  5 Sheets-Sheet 4
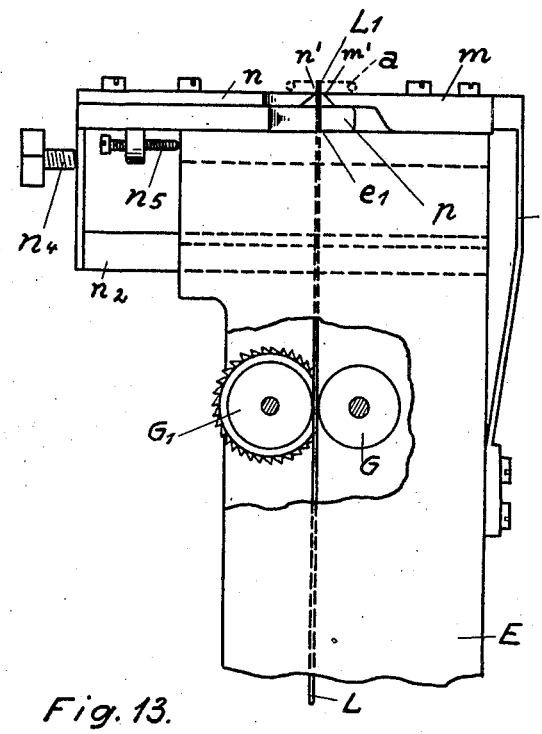
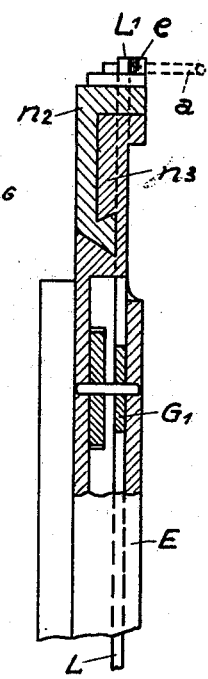
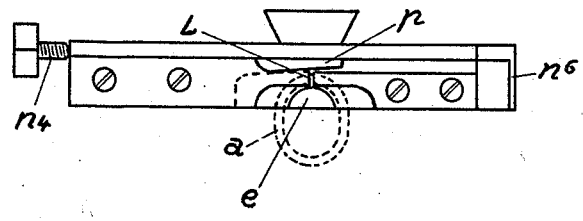
INVENTOR
Wilhelm Bittrolf
BY
Biesen Schrenk
ATTORNEYS Dec. 25, 1923.  
W. BITTROLF  
1,478,814  
MANUFACTURE OF CHAIN MESHWORK AND CHAINS  
Filed Aug. 30, 1921    5 Sheets-Sheet 5

INVENTOR  
Wilhelm Bittrolf  
BY  
Briesen Schrenk  
ATTORNEYS

Patented Dec. 25, 1923.

1,478,814

UNITED STATES PATENT OFFICE.

WILHELM BITTROLF, OF PFORZHEIM, GERMANY, ASSIGNOR TO ERNST GIDEON BEK, OF PFORZHEIM, GERMANY.

MANUFACTURE OF CHAIN MESHWORK AND CHAINS.

Application filed August 30, 1921. Serial No. 496,909.

(GRANTED UNDER THE PROVISIONS OF THE ACT OF MARCH 3, 1921, 41 STAT. L., 1313.)

*To all whom it may concern:*

Be it known that I, WILHELM BITTROLF, a citizen of the German Republic, and resident of Pforzheim, Germany, have invented certain new and useful Improvements in the Manufacture of Chain Meshwork and Chains (for which I have filed applications in Germany, filed Dec. 13, 1918; Aug. 7, 1920; September 15, 1920, and Nov. 26, 1920; Belgium, filed Jan. 7, 1921; England, filed Jan. 14, 1921; Norway, filed Feb. 14, 1921; Hungary, filed Feb. 18, 1921; France, filed Mar. 11, 1921; Italy, filed Feb. 2, 1921; Austria, filed Feb. 1, 1921; Czechoslovak Republic, filed Feb. 21, 1921; Netherlands, filed Feb. 24, 1921; Spain, filed Feb. 23, 1921; Denmark, filed Feb. 7, 1921; Sweden, filed Feb. 8, 1921; and Poland, filed Mar. 11, 1921); and I do hereby declare the following to be a full, clear, and exact description of the invention, such as will enable others skilled in the art to which it appertains to make and use the same.

The invention has reference to the manufacture of chain mesh-work and chains, in which first of all the wire is bent into a U-form and is then shaped round a mandrel to form a closed ring. But certain features of the invention may be utilized in connection with devices employing other ways of forming and attaching or connecting the rings.

The invention has reference more especially to the means for the introduction of the piece of solder into the closing joint, the means for holding it fast there, the means for severing it from the thread of solder, the means for securely closing the joint or joints so that the piece of solder is held fast and a general improvement of the machine as regards the formation of the ring.

Several constructional forms of the invention are shown in the drawings.

Figures 1 to 7 show a constructional form in which:—Figures 1, 2 and 3 are horizontal sections through the apparatus, showing the evolution of a ring member in three successive stages;

Fig. 4 is a vertical section through the closing mandrel;

Fig. 5 is an elevation of a mandrel;

Figs. 6 and 7 are enlarged sections through the upper end of the closing mandrel and the cutting off device;

Figs. 8 to 10 are respectively a plan, elevation and vertical section of a modified construction of the cutting off device.

Figs. 11 to 13 are elevation, vertical section and plan respectively of another modified constructional form.

Figs. 14 and 15 are section and plan respectively of a special form of construction of the mechanism for closing the joints and Fig. 16 is a plan, with parts in section, showing another form of the joiner for bending the ends of the wire to form a ring or link.

Figure 14:
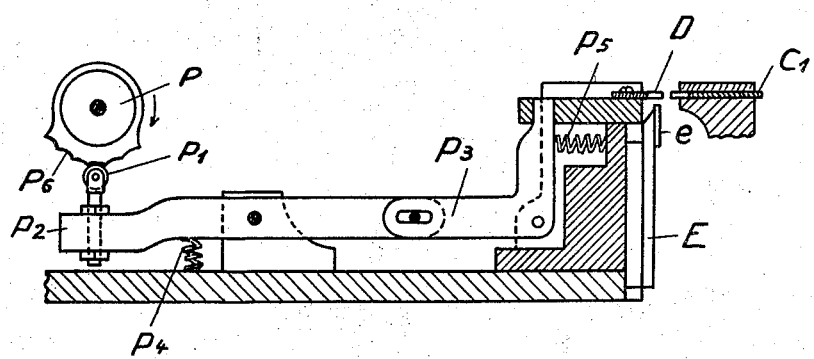

According to this invention a piece of wire $a$ is drawn, by the movement of a forming mandrel B, in the direction of the arrow into a swage or shaper (Fig. 2) which consists of two fixed parallel grooved cheek pieces and the movable shaper C. After the removal of the forming mandrel B the U-shaped wire yoke formed is fed forward by the shaper C (Fig. 3). At the same time the points of the yoke pass into the semi-circular space which is left between the groove $d$ of a joiner D and the surface of a closing mandrel E or rather of its upper end or point $e$. In this way the wire is compelled to fold together and to form the joint at the center of the joining device.

The mandrel E is arranged to move in a vertical guide. It consists of the semi-circular mandrel point $e$ and of the lower thicker part E which merges into the point $e$ with a sharp shoulder $e'$. In the mandrel is a passage F which serves for the guidance of the thread of solder L. This passage opens into the shoulder $e'$, which, in the upper position of the mandrel, lies in the plane of the ring $a$.

The flat thread of solder runs through a receptacle $f$ containing a liquid soldering flux and thence through a doffer $f'$, for removing the excess flux, into the passage F.

Upon each upward movement of the mandrel E the thread of solder is fed forward to a certain extent, the part so fed projecting beyond the surface of the shoulder $e'$ and corresponding to the thickness of the wire $a$. For this purpose two rollers G G' are provided on the mandrel, actuated by the vertical movement of the mandrel itself by means of a trip pawl $g$ rotatable round a fixed point on the frame and of the trip wheel $g'$ and gear wheel $g^2$. The rollers G G' may be fluted and press so strongly upon the flat sides of the thread of solder as to impress a row of flutings or grooves upon it. These facilitate the holding fast of the thread of solder in the closing joint of the ring.

When the forward fed end of the thread of solder comes into registry with the closing mandrel, at which the joint is to be made, the shaper has reached the position shown in Fig. 3. The joiner D then advances to the position shown in Fig. 4 and at the same time grips the end of the thread of solder in a notch $k$ which intersects the edge of the groove $d$; the joiner D presses the end $l$ of the thread of solder L upon the shoulder surface $e^2$ of the closing mandrel E and there holds it fast. At the same time this end $l$ of the thread of solder is cut off by means of a blade $k'$ (Fig. 7) which blade is integral with, or attached to, the joiner D and upon the movement thereof the cut-off piece of solder is swept over the mouth of the passage F. After these movements the joint of the chain link is entirely closed by the complete pressing in of the wire ends $a$. Previous to this closure the piece of solder has only been held fast in the notch $k$ and kept in its proper position by pressure against the point $e$ of the mandrel.

The special formation of the joint also serves for holding the piece of solder fast in the joint, such formation being produced by the use of the circular knife A for cutting off the wire $a$ (Fig. 1), the bevelled shape of the edges of the wire forming a somewhat triangular gap at the joint, open towards the inner side of the ring.

It will be seen from the drawings how the double tapering form of the cutting edge of the circular knife A produces an oblique cutting off of the wire ends, which, upon the closing of the joint, first brings the outer edges of the joint together. Hence on this side an especially solid closure is obtained. The slight concavity of the cut surfaces, which also improves the joint, cannot be made apparent on the drawings on account of their relatively small scale.

The arrangement of a circular knife has furthermore the advantage that, in the event of the cutting edge becoming blunt at one point, a fresh sharp point can be brought into use by a slight rotation. It will be understood that normally the knife A does not rotate, but by loosening the screw that holds the knife, the latter can be freed for circumferential adjustment.

A further improvement of the joiner D can also be seen from the drawings. This joiner is formed like a fork with projecting prongs. These prongs are so long that they penetrate into the clear space of the two adjacent rings of the chain mesh-work and thus insure the positive introduction of the points of the U-shaped yoke into these rings.

Figs. 8 to 10 show a modified constructional form which differs substantially from that already described in that a special knife, movable independently of the joiner D, is provided for cutting off the point of the strip of solder. In combination with this the strip of solder L is guided through a passage, which opens close to the semi-circular upper surface of the mandrel point. In this way any lateral displacement of the severed end of the solder strip is avoided, and the cutting off itself can take place at any period of time desired, e. g. after the end of the strip of solder is already held fast in the joint, between the terminal surfaces of the wire. Furthermore in the construction first described the knife $k'$ acted upon the narrow side of the strip of solder, whereas in the present form it can be allowed to act upon the flat side whereby the severing is facilitated.

The formation of the ring is effected in the manner herein before described. The upper end of the mandrel E, however, is now made of another shape, (as shown on a larger scale in Fig. 10) in order to permit access of the knife 1 to the strip of solder. For this purpose the mandrel is no longer provided with a square shoulder at the point where the strip L emerges, but is bevelled off. The lower surface of the joiner D is also provided with a flat dishing or concave recess. This allows the blade of the obliquely located knife $l$ to approach the wire $a$ so closely that as little as possible of the severed piece of solder will project beyond the closing joint of the ring. The knife $l$ is mounted upon a slide 2 which is given its operative or cutting stroke by means of a pin 3 upon an arm 4 receiving an intermittent oscillation from the main shaft by well known means.

In Figs. 11 to 13 a further improvement of the severing device is shown, which enables thinner strips of solder to be cut off and, consequently, to be used for finer chain wire. For this purpose the severing device is constructed as an individual mechanism by itself and is quite independent of the guide passage, through which the strip of solder is fed to the joining point of the chain member to be formed. This guide passage ceases some distance below this point, so that the end of the strip of solder projects freely therefrom. The severing device is mounted above the mouth of the guide passage and consists of a horizontal knife, which is mounted rigidly upon the mandrel, and of a second movable knife which slides horizontally on the upper side of the mandrel. The two knife blades lie directly under the under surface of the joiner. With the movable knife there is, furthermore, connected a wedge member which causes the freely projecting end of the strip of solder to be pressed close upon the mandrel on the movement of the knife. E is the lower part of the mandrel which slides in a vertical guide in the frame and at the top carries the closing mandrel properly so-called $e$ and guides the strip of solder L and moves it upwards by means of the rollers G G'. The strip of solder passes at $e'$ out of the horizontal upper surface of the mandrel portion E, so that its end L' projects freely from here without any guides. Some distance above $e'$ there is rigidly mounted the horizontal knife $m$ so that its blade $m'$ stands exactly beneath one of the closing joint surfaces of the ring $a$, shown in dotted lines. A second knife $n$ with blade $n'$ is mounted upon the horizontal carriage $n^2$ which slides in a guide $n^3$ of the mandrel E and is moved by a striker $n^4$, the movement of the blade $n'$ toward the blade $m'$ being limited by means of a stop $n^5$. A leaf spring $n^6$ bears against the right end of the carriage $n^2$ and causes its return movement after cutting off the strip of solder.

In order to guide the upper end of the strip of solder above the point $e'$ upon the unsupported or free upright severed piece, and to press same on the closing mandrel $e$, the following arrangement has been made. On the carriage $n^2$ there is provided, below the knives $m$ and $n$ and in the space between these and the upper surface of the lower mandrel part E, a wedge member $p$ which, upon the forward thrust of the carriage $n^2$ engages the narrow side of the end L' of the strip of solder and presses it against the mandrel $e$.

The method of operation of the device shown in Figs. 11, 12 and 13 is as follows:—

By the vertical movement of the mandrel E the strip of solder L is pushed forward as described in connection with the first form of my invention to the extent of the thickness of the chain wire so that it projects to the same extent beyond the knife blades $m'$, $n'$. Hereupon the knife $n$ is pushed forwards and, with its blade, first of all exactly adjusts the strip of solder to the point at which the closing joint of the ring is to be formed. At the same time the wedge member $p$ pushes the end of the solder strip closely against the closing mandrel $e$. The ring $a$ is now closed, so that the two terminal surfaces of the wire bear closely upon the strip of solder. At the same time the joiner (not shown in Figs. 11, 12 and 13) moves into its terminal position and, in the manner described above, receives the end of the solder strip in a notch. Hereupon the carriage $n^2$ completes its movement to the right against the pressure of the spring $n^6$ and cuts off the strip of solder.

This severing device enables solder strips of a thickness of 0.02 mm. and chain wire of a thickness of 0.3 mm. to be used.

By reason of the certainty of the cutting action, complete independence is attained of the material of the solder strip which, as regards its hardness and other properties affecting the cutting operation, can be chosen at will in accordance with the requirements of the soldering work to be done.

In order to secure the holding fast of the piece of solder in the closing joint, during the various movements which a chain or mesh-work is given before or during the completion of the soldering, the usual method of closing the joint has been modified. This modified method is especially designed for cases where very hard chain wire is used.

Furthermore, in the case of very thin wires, it often occurs that the sheet of solder inserted in the joint does not hold absolutely tight till the soldering has been completed.

These two drawbacks are, according to this part of the invention, obviated by the substitution for the simple closing pressure of a joiner upon the member around the mandrel, of a number of rapid hammer like blows or thrusts delivered by the joiner. Owing to this not only is the rounding off improved, but also the pressure of the two closing joint surfaces against each other is so strengthened that a plate of solder can now be held fast with certainty in any case.

Figure 15:
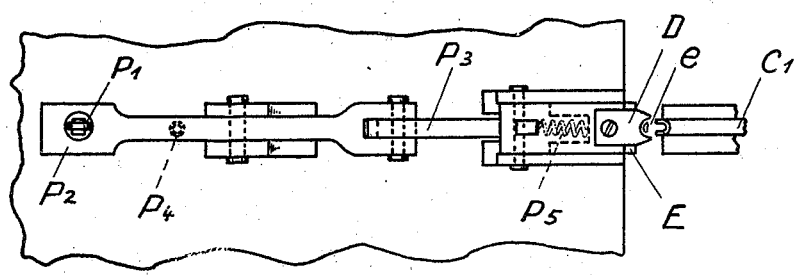

Figs. 14 and 15 show a device adapted to carry out a hammering process of this kind. E is the lower part of the mandrel with the closing mandrel $e$, which co-operates with the joiner D and with the shaper C'. The joiner D is driven by the cam disc P which, by means of the roller P', the lever P², the lever P³, and the springs P⁴, P⁵ acts upon the joiner D. The cam disc, however, is provided with a number of elevations and depressions P⁶, which cause a rapid backward and forward movement of the joiner D. In this way not only is the joint made more rigid but the rounding off of the ring also becomes more perfect.

The succession of pressure and release periods produced by the joiner can, when forming the ring, also be so utilized, even when introducing the wire leg into the hollow space between the mandrel $e$ and the joiner D, as to cause a small expansion of this hollow space and thus facilitate the penetration of the wire into the space between the joiner and the mandrel, this space being widened by loosening or withdrawing the joiner a little bit.

Fig. 16 shows a modification of the joiner D. The joiner is composed of two parts, the joiner proper D and a die D', guided in the central line of the joiner D. This die is moved independently of the joiner and is pressed against the formed link after it has been closed. The die is fork-shaped at its working end, the two legs D² of the fork are spaced at such a distance as to press on the wire ends near both sides of the seam. Hereby the metal near the seam is expanded towards the seam and this expansion serves to press the piece of solder metal and prevent its removal from the seam by any accident. The legs of the fork may be wedge-shaped. The die D may make a plurality of strokes.

Now what I claim and desire to secure by Letters Patent is the following:—

1. In a machine of the character described, the combination of a device for feeding a strip of solder, link-forming implements to bend a piece of wire and bring its ends against the end of the solder strip while the solder strip is continuous, and cutting means for severing the strip portion thus brought between the ends of the wire from the body of said solder strip, said cutting means comprising a fixed knife arranged immediately under the lower surface of the ring in the process of formation and at one side of the solder strip, a movable knife arranged on the opposite side of the solder strip, and means to actuate said movable knife after the ring has been closed around the end of the solder strip.

2. In a machine of the character described, the combination of a device for feeding a thread of solder, link-forming implements to bend a piece of wire and bring its ends against the end of the solder thread, a cutting off device for the thread of solder consisting of a fixed knife arranged immediately under the lower surface of the ring, a movable knife guided to cut the end of the thread of solder from its flat side and of means to actuate said knife after the ring has been closed around the end of the thread of solder.

3. In a machine of the character described, the combination of a device for feeding a thread of solder, link-forming implements to bend a piece of wire and bring its ends against the end of the solder thread, a mandrel, a cutting off device for the thread of solder, consisting of a fixed knife arranged immediately under the lower surface of the ring and at a distance above the top of the lower part of the mandrel, a knife moving in guide ways at the top of the lower part of the mandrel and of means to actuate said knife after the ring has been closed around the end of the thread of solder.

4. In a machine of the character described in claim 3, a wedge piece connected with the moving knife and adapted to press the end of the thread of solder against the upper part of the mandrel.

5. In a machine of the character described, the combination of link-forming implements to bend a piece of wire to link formation, a device for feeding the end of a continuous strip of solder to the point at which the ends of said wire are bent into link formation, without destroying the continuity of said strip, and means for severing the end of said strip in proximity to the link, said cutting means comprising a fixed knife arranged immediately under the lower surface of the ring in the process of formation and at one side of the solder strip, a movable knife arranged on the opposite side of the solder strip, and means to actuate said movable knife after the ring has been closed around the end of the solder strip.

6. In a machine of the character described, means for feeding a continuous strip of solder and link-forming implements for bending a piece of wire and bringing the ends of said wire toward each other at a point of the path of the continuous strip thus fed, and means to sever the end of the continuous strip in proximity to the formed link, said cutting means comprising a fixed knife arranged immediately under the lower surface of the ring in the process of formation and at one side of the solder strip, a movable knife arranged on the opposite side of the solder strip, and means to actuate said movable knife after the ring has been closed around the end of the solder strip.

7. In a machine of the character described, the combination of link-forming implements for bending a wire into link formation, a device for feeding a flat solder strip and bringing its end into operative relation to the ends of the wire, and severing means operating against the flat side of said strip, said cutting means comprising a fixed knife arranged immediately under the lower surface of the ring in the process of formation and at one side of the solder strip, a movable knife arranged on the opposite side of the solder strip, and means to actuate said movable knife after the ring has been closed around the end of the solder strip.

8. In a machine of the character described, in combination, a joiner provided with a notch at its apex to receive the ends of a wire link, a device for feeding a strip of solder between said ends, and means to impart a plurality of forward and backward strokes to the joiner to better close the said ends of the link upon the solder.

9. In a machine of the character described, in combination, a joiner provided with a notch at its apex to receive the ends of a wire link, means for intermittently feeding a strip of solder between said ends and means to impart forward and backward strokes to the joiner both while such strip is being fed and after the closing of the seam of the ring.

In testimony whereof I affix my signature this 8th day of August 1921.

WILHELM BITTROLF.